United States Patent
Huang et al.

(10) Patent No.: US 12,002,186 B1
(45) Date of Patent: Jun. 4, 2024

(54) SURROUND AREA DETECTION AND BLENDING FOR IMAGE FILTERING

(71) Applicant: Dolby Laboratories Licensing Corporation, San Francisco, CA (US)

(72) Inventors: Tsung-Wei Huang, Sunnyvale, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/568,104

(22) PCT Filed: Jun. 1, 2022

(86) PCT No.: PCT/US2022/031795
§ 371 (c)(1),
(2) Date: Dec. 7, 2023

(87) PCT Pub. No.: WO2022/260907
PCT Pub. Date: Dec. 15, 2022

Related U.S. Application Data

(60) Provisional application No. 63/209,602, filed on Jun. 11, 2021.

(30) Foreign Application Priority Data

Jun. 11, 2021 (EP) .................................... 21178935

(51) Int. Cl.
*G06T 5/20* (2006.01)
*G06T 5/40* (2006.01)
(Continued)

(52) U.S. Cl.
CPC .................. *G06T 5/20* (2013.01); *G06T 5/40* (2013.01); *G06T 5/70* (2024.01); *G06V 10/764* (2022.01); *G06T 2207/20192* (2013.01)

(58) Field of Classification Search
CPC .... G06T 5/20; G06T 5/40; G06T 5/70; G06T 2207/2019; G06V 10/764
See application file for complete search history.

(56) References Cited

U.S. PATENT DOCUMENTS 5,351,135 A 9/1994 Saeger
6,714,594 B2 3/2004 Dimitrova
(Continued)

FOREIGN PATENT DOCUMENTS

EP 0800311 A1 10/1997
EP 2108177 B1 4/2019
(Continued)

OTHER PUBLICATIONS

Viero, and Neuvo. "Non-moving regions preserving median filters for image sequence filtering." IEEE 1991 International Conference on Systems Engineering. IEEE, 1991. (Year: 1991).*
(Continued)

*Primary Examiner* — Andrae S Allison

(57) ABSTRACT

Methods and systems to detect and blend a surround area to avoid filtering artifact due to the area in image filtering are disclosed. The described methods include a compensation step and can be applied to arbitrary images with padded areas of arbitrary shape, such as letterboxes, pillar-boxes, ovals, or other shapes, including logos and close captions. Such methods detect the surround areas in the image with possible compression artifact and noise, and then perform blending to minimize the effects of the surround areas for any arbitrary image filtering operations.

23 Claims, 12 Drawing Sheets

(51) Int. Cl.
  *G06T 5/70*    (2024.01)
  *G06V 10/764*  (2022.01)

(56) References Cited

U.S. PATENT DOCUMENTS

| | | | |
|---|---|---|---|
| 6,947,097 | B1 | 9/2005 | Joanblanq |
| 7,538,821 | B2 | 5/2009 | Ahn |
| 9,135,720 | B2* | 9/2015 | Huang .................. G06T 7/62 |
| 9,473,792 | B2 | 10/2016 | Srinivasamurthy |
| 10,257,487 | B1 | 4/2019 | Tamatam |
| 10,748,235 | B2 | 8/2020 | Tamatam |
| 2012/0206567 | A1 | 8/2012 | Zafarifar |
| 2019/0045193 | A1 | 2/2019 | Socek |

FOREIGN PATENT DOCUMENTS

| | | |
|---|---|---|
| WO | 2007052957 A1 | 5/2007 |
| WO | 2019217751 A1 | 11/2019 |
| WO | 2020219341 A1 | 10/2020 |
| WO | 2022072884 A1 | 4/2022 |

OTHER PUBLICATIONS

Balisavira et al, Real-time Object Detection by Road Plane, Segmentation Technique for ADAS, 2012 Eighth International Conference on Signal Image Technology and Internet Based Systems (Year: 2012).*

Akilan, Thangarajah, QM Jonathan Wu, and Yimin Yang. "Fusion-based foreground enhancement for background subtraction using multivariate multi-model Gaussian distribution." Information Sciences 430 (2018): 414-431. (Year: 2018).*

Maurer, Calvin, Rensheng Qi, and Vijay Raghavan, "A Linear Time Algorithm for Computing Exact Euclidean Distance Transforms of Binary Images in Arbitrary Dimensions," IEEE Transactions on Pattern Analysis and Machine Intelligence, vol. 25, No. 2, pp. 265-270, Feb. 2003, 6 pages.

Wells, William, "Efficient Synthesis of Gaussian Filters by Cascaded Uniform Filters" IEEE Transactions on Pattern Analysis and Machine Intelligence, vol. 8, No. 2, pp. 234-239, 6 pages.

* cited by examiner

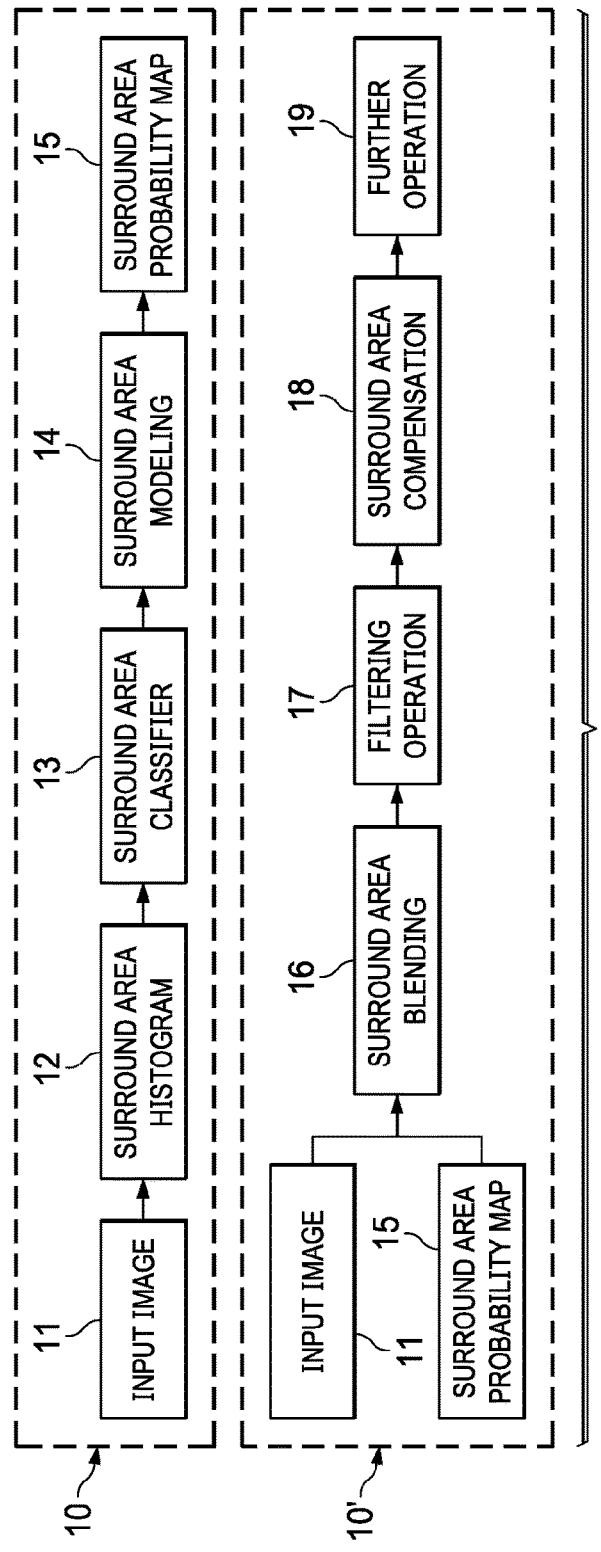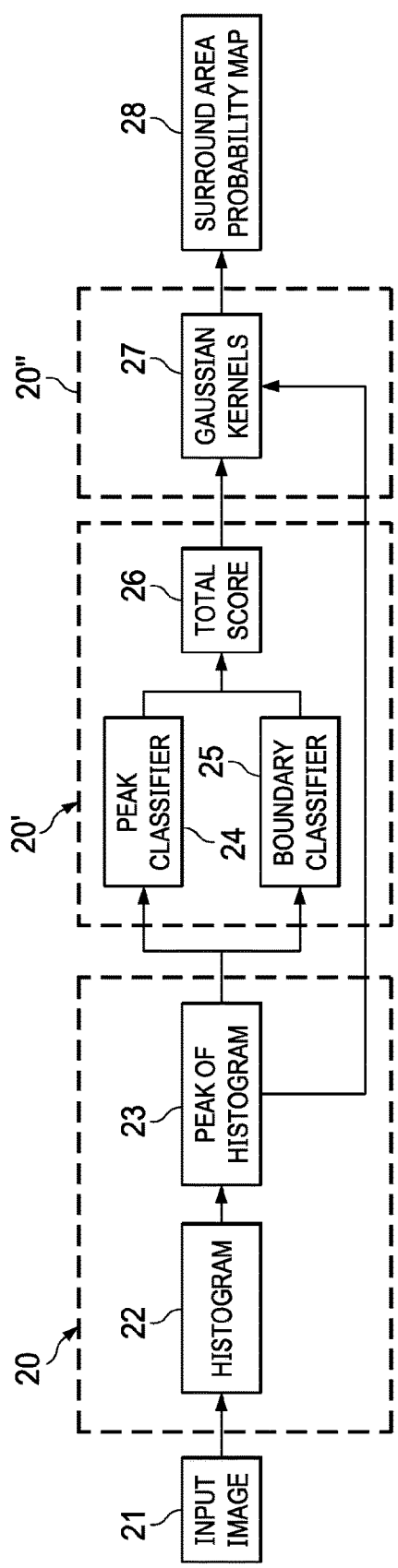

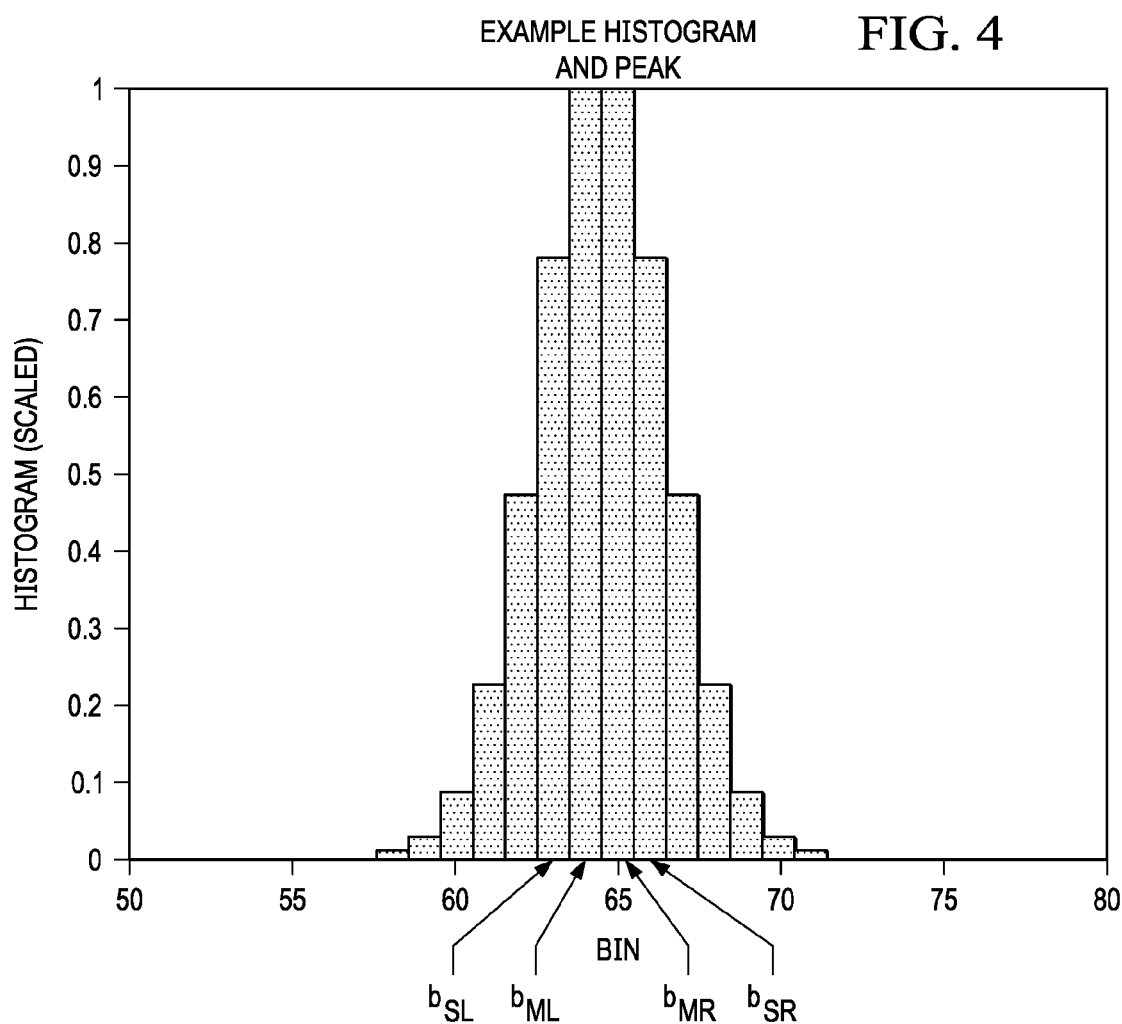

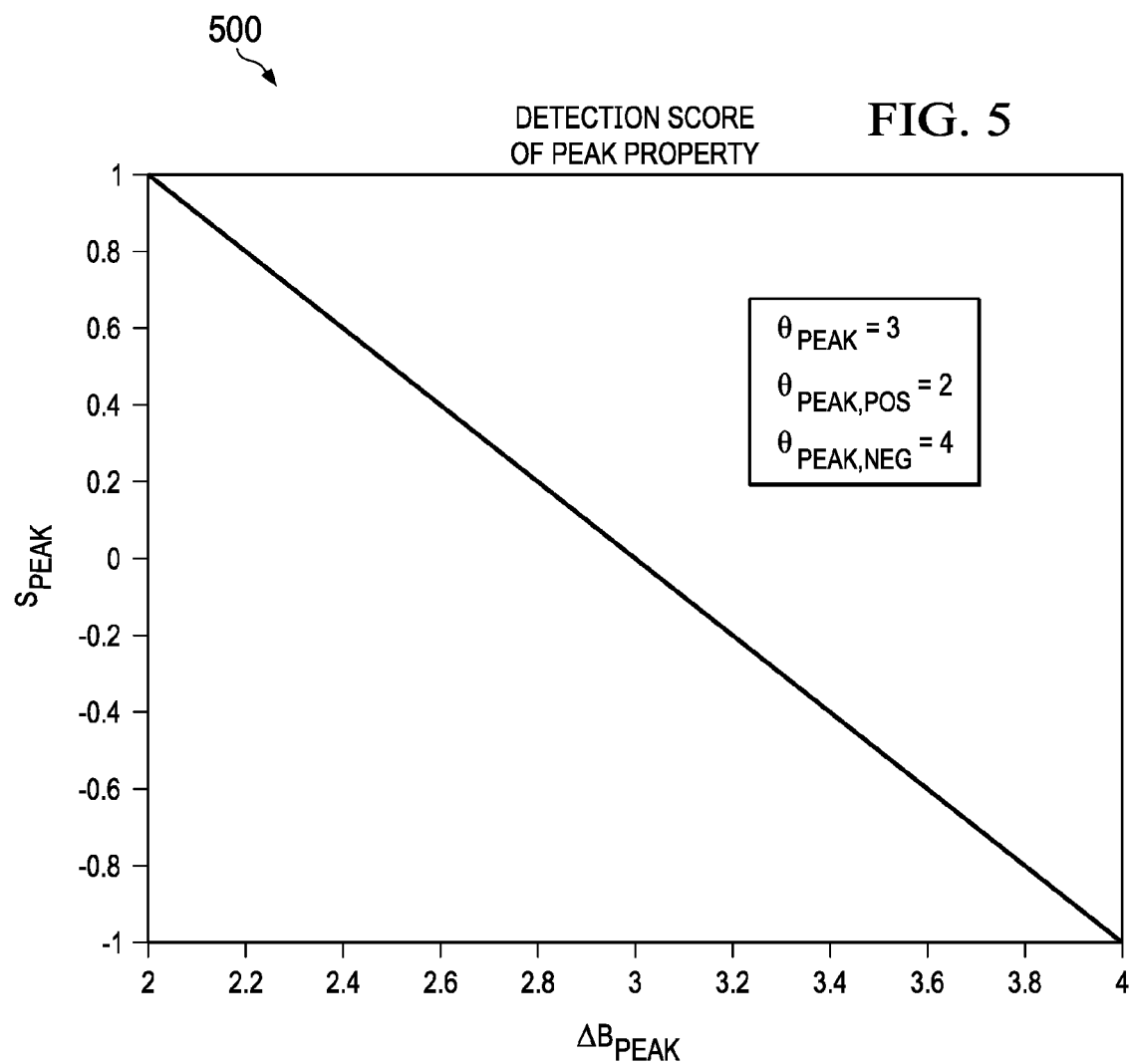

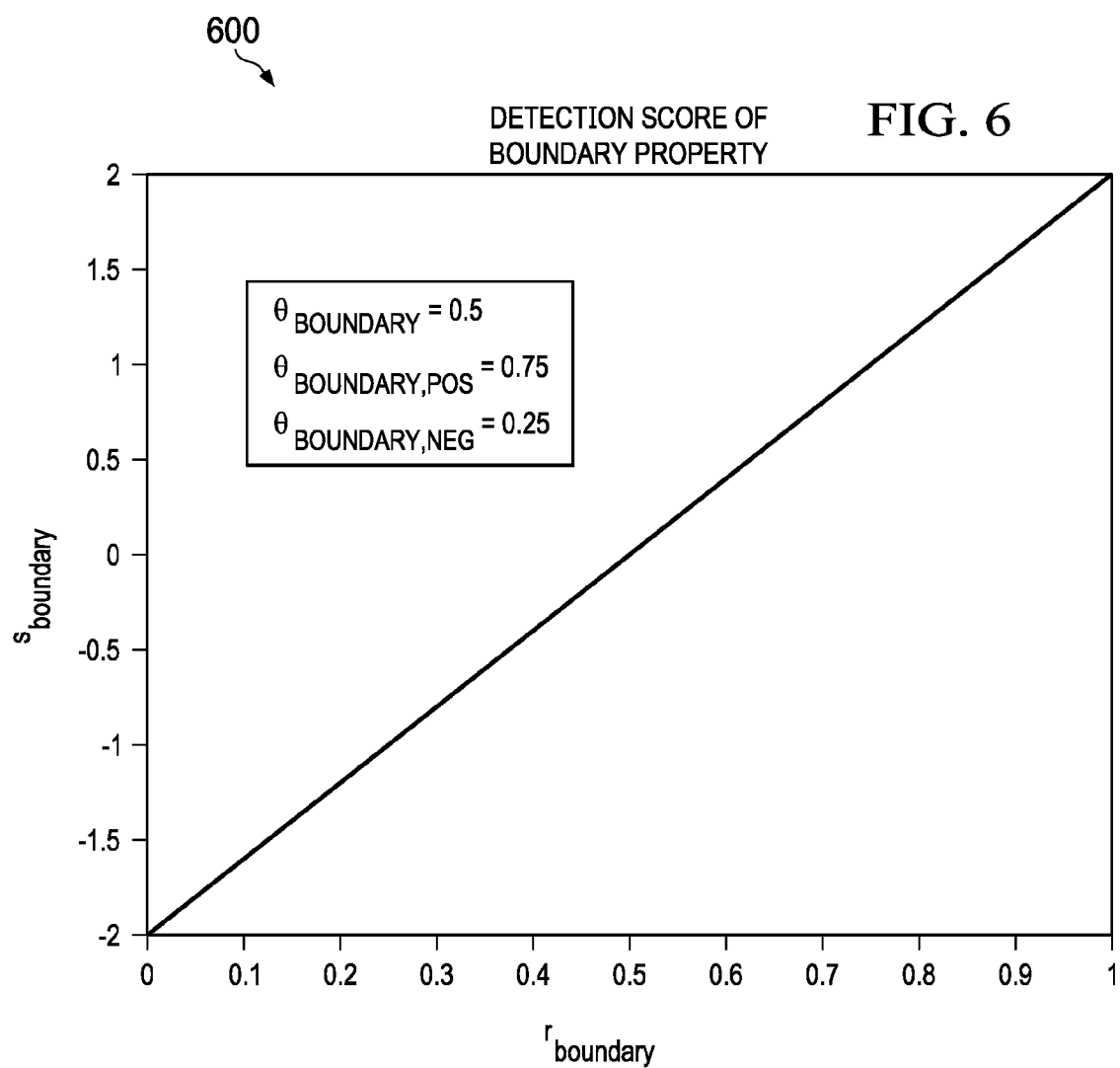

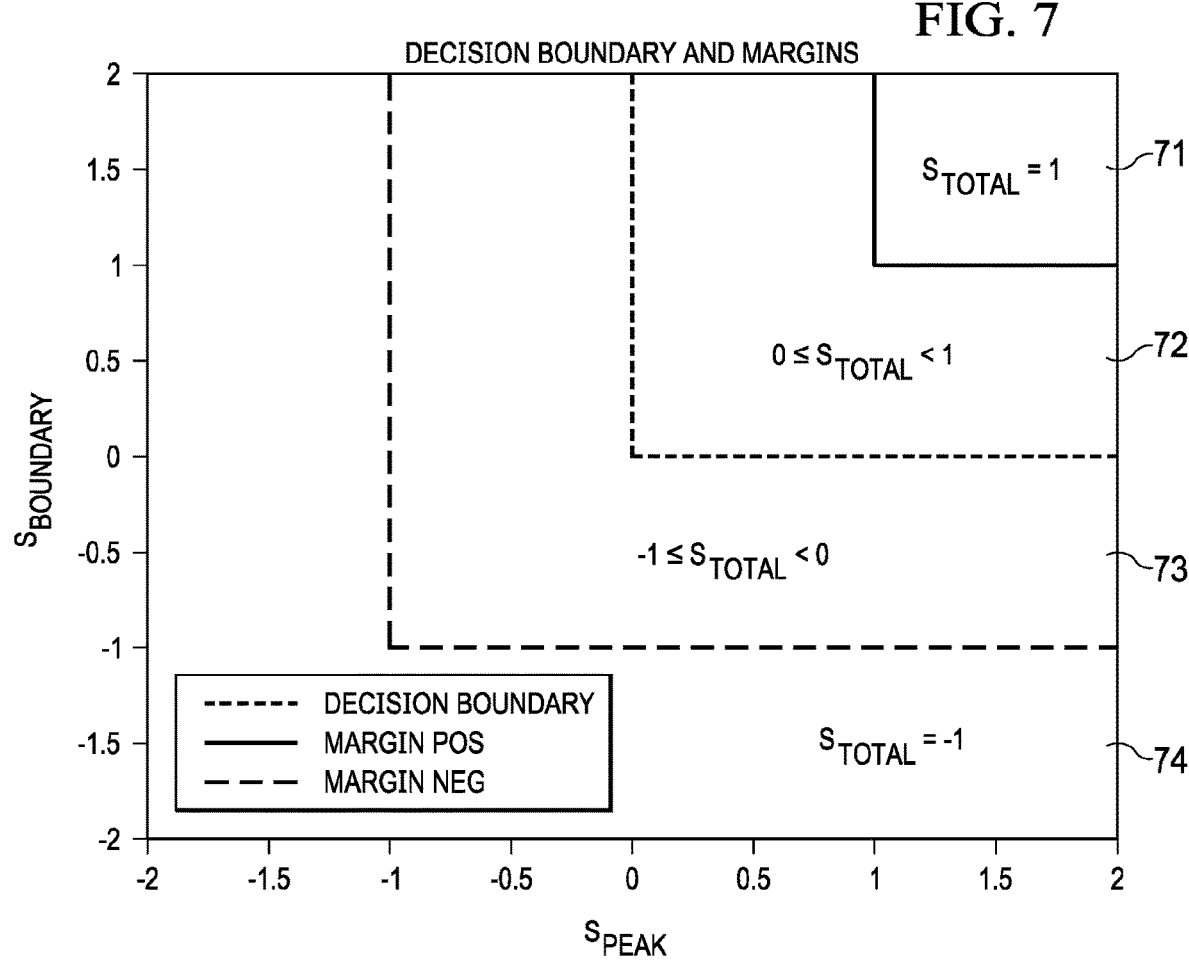

SURROUND AREA DETECTION AND BLENDING FOR IMAGE FILTERING

CROSS-REFERENCE TO RELATED APPLICATIONS

This application is a U.S. National Stage application under U.S.C. 371 of International Application No. PCT/US2022/031795, filed on Jun. 1, 2022, which claims the priority benefit of U.S. Provisional Application No. 63/209,602, filed Jun. 11, 2021 and EP Application No. 21178935.9, filed Jun. 11, 2021, each of which is hereby incorporated by reference in its entirety.

TECHNICAL FIELD

The present disclosure relates in general to image processing. In particular, this disclosure relates to surround area detection and blending for image filtering

BACKGROUND

Generally, images may include non-active areas surrounding the main subject of such images. Such non-active areas may be of arbitrary shapes (e.g. rectangular, circular, oval or any other geometrical shapes) or any arbitrary irregular shapes. Moreover, non-active areas in images may contain text, labels, or caption. It is highly desired to detect and blend the surround area to avoid the filtering artifact due to surround area in image filtering. In the existing filtering operation, surround areas are assumed to be noise-free rectangles and excluded during image filtering. This may work well for the noise-free in-house studio contents. However, for other video contents which have logo, text or noise in the surround area or non-rectangular surround areas, the existing basic method may create banding/halo artifact near the surround area. Such filtering artifact could be amplified and degrade the visual quality in further operations, such as local reshaping or other operations based on the filtering output.

SUMMARY

The term "surround area" used herein refers to non-active (static) regions around an image or video frame (typically referred to as the "active area"). Examples of surround area include the black bands known as letterbox or pillarbox to accommodate a variety of video/film aspect ratios within a typical 16:9 television frame. Surround areas can have an arbitrary shape such as rectangle, circle, ellipse or any other irregular shape. Surround areas are typically distinguished by their "monotonic" color, say black or gray; however, in many cases, text (e.g., subtitles) or graphics (e.g., logos) may be overlaid over these areas.

The disclosed methods and devices provide an efficient framework to detect and blend the surround area to avoid the filtering artifact due to surround area in image filtering.

Compared to existing methods that can only handle rectangular areas, such as letterboxes or pillar-boxes, the described method can be applied to arbitrary images with padded dark, monochromatic, colored, or white areas of arbitrary shape, such as letterboxes, pillar-boxes, ovals, or any other shapes. Moreover, the disclosed methods are also applicable to surround areas that contain text, logos and close captions. As will be described in more detail, the disclose method excludes such texts, logos and close captions from the surround area.

The described methods detect the surround areas in the image with possible compression artifact and noise, and then perform blending to minimize the effects of surround areas for any image filtering operations.

An embodiment of the present invention is method for detecting a surround area in an image, the method comprising: calculating a histogram of a boundary area of the image; finding a peak and a width of the histogram; based on the peak and the width of the histogram, classifying a presence of the surround area in the image, thereby generating a peak detection score; based on a ratio of the pixels that belong to the peak on a minimum possible surround areas at the boundary area of the image, classifying the presence of the surround area in the image, thereby generating a boundary detection score; generating a total score based on a combination of the peak and the boundary detection scores, and detecting the presence of the surround area based on the total score.

A method may be computer-implemented in some embodiments. For example, the method may be implemented, at least in part, via a control system comprising one or more processors and one or more non-transitory storage media.

Some or all of the methods described herein may be performed by one or more devices according to instructions (e.g. software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure may be implemented in a non-transitory medium having software stored thereon. The software may, for example, be executable by one or more components of a control system such as those disclosed herein. The software may, for example, include instructions for performing one or more of the methods disclosed herein.

At least some aspects of the present disclosure may be implemented via an apparatus or apparatuses. For example, one or more devices may be configured for performing, at least in part, the methods disclosed herein. In some implementations, an apparatus may include an interface system and a control system. The interface system may include one or more network interfaces, one or more interfaces between the control system and memory system, one or more interfaces between the control system and another device and/or one or more external device interfaces. The control system may include at least one of a general-purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to one or more processors.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements, but different reference numbers do not necessarily designate different elements between different drawings.

BRIEF DESCRIPTION OF DRAWINGS

FIG. 1 shows an exemplary flowchart of surround area detection and blending according to an embodiment of the present disclosure.

FIG. 2 shows an exemplary flowchart of the surround area detection process according to an embodiment of the present disclosure.

FIG. 4 shows an exemplary histogram of the boundary area of an image calculated according to an embodiment of the present disclosure.

FIG. 5 shows an exemplary graph illustrating the linear variations of the score vs. the observed noise in a peak classifier according to an embodiment of the present disclosure.

FIG. 6 shows an exemplary graph illustrating the score as a function of a ratio of the pixels in a boundary classifier according to an embodiment of the present disclosure.

FIG. 7 shows exemplary classifier margins according to an embodiment of the present disclosure.

DETAILED DESCRIPTION

Figure 3:
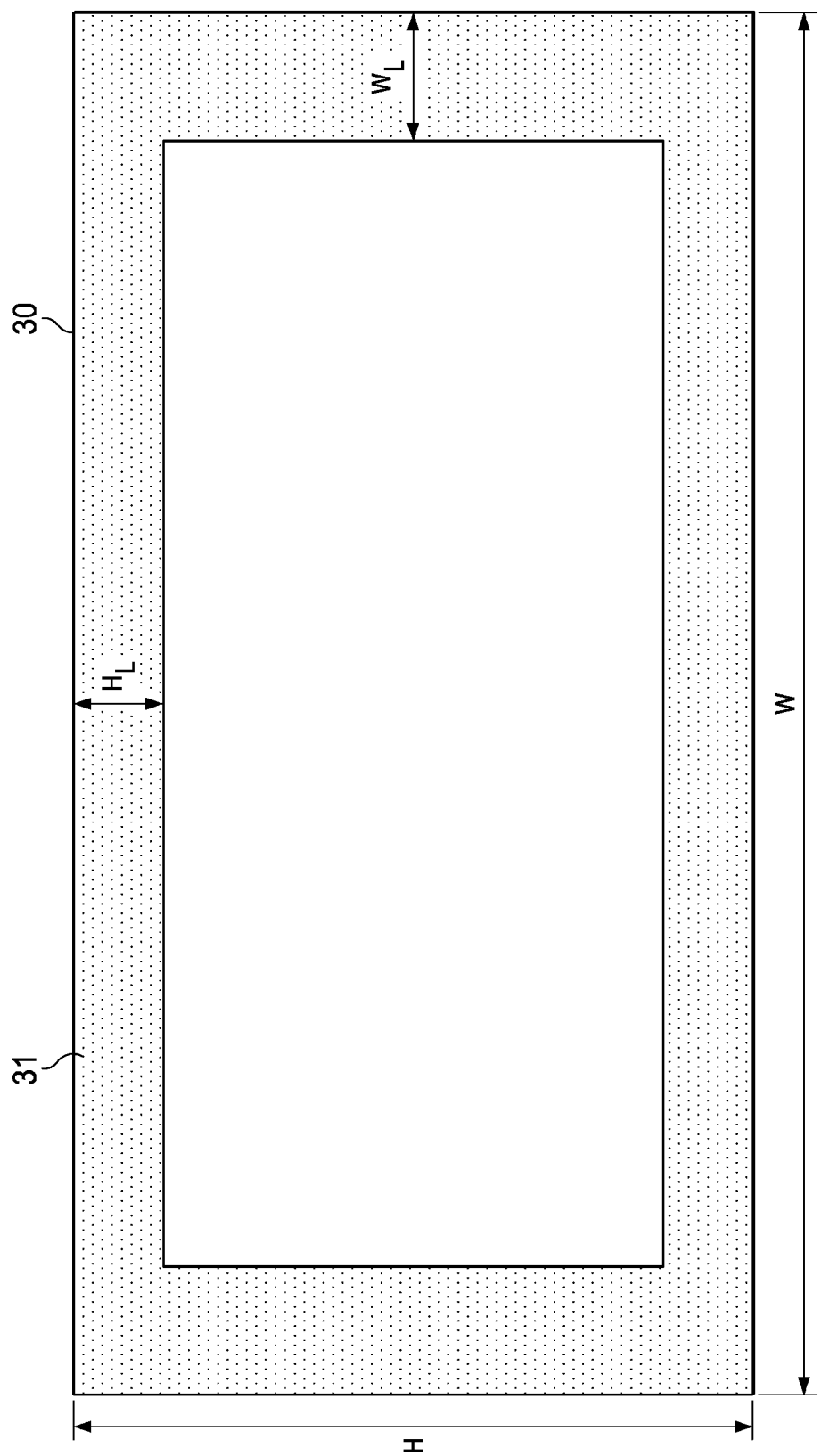
FIG. 3 shows an exemplary image with boundary region used to calculate the surround area histogram according to an embodiment of the present disclosure.

As shown in the exemplary embodiment of FIG. 1, the disclosed method comprises two components or steps, i.e. surround area detection (10) and surround area blending (10'). Given an input image (11), surround area histogram (12) properties are first analyzed. A surround area classifier (13) with soft decision boundary is then used to detect possible presence of surround area in the input image (11). If surround area is detected, the pixel value of the surround area is modeled (14), e.g. using Gaussian kernels, and a surround area probability map (15) is generated as output.

In step (10'), in order to avoid filtering artifact near the surround area, based on a combination of input image (11) and generated surround area probability map (15), the surround area is blended as shown in step (16). In accordance with an embodiment of the present disclosure, filtering operation (17) can be any sort of image filtering (e.g. edge-preserving filtering as described, for example, in U.S. Prov. App. Ser. 63/086,699 filed by the applicant of the present disclosure, for "Adaptive Local Reshaping For SDR-To-HDR Up-Conversion" filed on Oct. 2, 2020 and incorporated herein by reference in its entirety). After filtering (17), the previously blended surround area in the initial filtered image is compensated, as shown in step (18), so that it is consistent to the original input image (11). Finally, the compensated filtered image is sent to further operation (19), such as local reshaping or other operations based on the filtering output. In what follows exemplary embodiments of surround area detection (10) and blending (10') are described in more detail.

A. Surround Area Detection

FIG. 2 shows an exemplary diagram of the surround area detection process according to an embodiment of the present disclosure. Given an input image (21), as shown in step (20), the histogram (22) of the boundary region of the image (21) is first calculated, then followed by calculating the peak of histogram (23) and the width of the calculated peak. As part of the following step (20') a peak classifier (24) is then used to classify whether the image has surround area or not based on the property of the peak. Moreover, as an additional part of step (20'), based on the property of the image boundary, a boundary classifier (25) is also used to determine the possible presence of surround area in the input image (21). The results of steps (24, 25) are then merged and a total score (26) is obtained based on such results. If surround area is detected, the pixel value of the surround area is modeled in a subsequent surrounding area modeling step (20") using, for example, Gaussian kernels (27). By way of the Gaussian kernels (27), a surround area probability map (28) is generated as output. In what follows, the elements of the diagram of FIG. 2 are described more in detail.

A.1. Surround Area Histogram

According to an embodiment of the present disclosure, two assumptions about the surround area may be made: 1) the surround area in an image has constant pixel value with some noise, and 2) the surround area is "stuck" to the boundary of the image. Based on these two assumptions, it can be expected that if a surround area exists, there will be a peak in the histogram of the boundary region of the image.

In what follows, the input image and its Y-channel are denoted as S and $S^Y$, respectively. For illustration purpose, FIG. 3 shows an exemplary image (30) with boundary region (31) used to calculate the surround area histogram. The image width and height are denoted as W and H, respectively. For the sake of efficiency, in the exemplary embodiments throughout the disclosure, only the Y-channel is considered in the disclosed detection framework and the Y-channel of the input image is referred to as the input image throughout the disclosure, although other channels (e.g. chroma) can also be used as the input in other embodiments.

With continued reference to FIG. 3, the boundary region (31) may be defined as located between the topmost and bottommost $H_L$ rows and between the leftmost and rightmost $W_L$ columns. Empirically, width $W_L$ and height $H_L$ may be set, for example, as $W_L$=round (0.05×W) and $H_L$=round (0.05×H). The histogram is considered to have $N_B$ bins of bin width $w_{bin}$ starting at pixel value $s_{start}$. Because the surround area may have darker pixel values, there may be no need to calculate the histogram for the complete brightness range but only the darker part. As an example, various parameters may be set as $s_{start}$=0, $w_{bin}$=1 and $N_B$=128 for 10-bit input image which has pixel value ranges from, for example, 0 to 1023. $S_{start}$ is the pixel value at which the histogram starts, Ng is the number of bins in histogram and $w_{bin}$ is the width of each bin.

The following table shows an example of how the histogram of boundary region of the image is calculated in accordance with the teachings of the present disclosure.

```
Calculate histogram of boundary region of the image
Input: input image S^Y, starting pixel value in histogram s_start, bin width w_bin, number of
bins in histogram N_B, width and height of boundary W_L and H_L
Output: histogram hist
// Initialize histogram
for(b = 0; b < N_B; b + +) {
   hist(b) = 0
}
// Top boundary
for (i = 0; i < H_L; i + +) {
   for(j = 0; j < W; j + +) {
      b = ⌊(S^Y (i, j) - s_start)/w_bin⌋
      if (0 ≤ b < N_B) {
         hist(b) + +
      }
   }
}
// Bottom boundary
for (i = H - H_L; i < H; i + +) {
   for (j = 0; j < W; j + +) {
      b = ⌊(S^Y (i, j) - s_start)/w_bin⌋
      if (0 ≤ b < N_B) {
         hist(b) + +
      }
   }
}
// Left boundary (exclude overlapped areas)
for (i = H_L; i < H - H_L; i + +) {
   for(j = 0; j < W_L; j + +) {
      b = ⌊(S^Y (i, j) - s_start)/w_bin⌋
      if (0 ≤ b < N_B) {
         hist(b) + +
      }
   }
}
// Right boundary (exclude overlapped areas)
for (i = H_L; i < H - H_L; i + +) {
   for(j = W - W_L; j < W; j + +) {
      b = ⌊(S^Y (i, j) - s_start)/w_bin⌋
      if (0 ≤ b < N_B) {
         hist(b) + +
      }
   }
}
return hist
```

Upon calculating the histogram of the boundary region, the highest peak and its width in the histogram are calculated as the potential surround area pixel value. The peak is defined as the leftmost contiguous bins with the maximum value, and the width is defined by the bins on the two sides of the peak where the histogram value drops to $r_{peak}$ ratio of maximum. As an example, $r_{peak}$ may be set as $r_{peak}=\exp(-0.5) \approx 0.6065$, so that when the peak is close to Gaussian distribution, half of the width of the peak is close to the standard deviation. FIG. 4 shows an exemplary histogram and the peak. $b_{ML}$ and $b_{MR}$ are the left-most and the right-most bins that defines the contiguous maximum of the peak. $b_{SL}$ and $b_{SR}$ are the left-most and right-most bins that define the width of the peak. Optionally, some form of smoothing (e.g. convolution with a Gaussian kernel) on the histogram may be performed if the image noise is too sparse. The following table shows an example of how the peak in the histogram is calculated.

```
Find peak in histogram
Input: histogram hist, number of bins in histogram N_B, ratio to maximum r_peak
Output: leftmost and rightmost bins with the maximum value of the peak b_ML and b_MR,
leftmost and rightmost bins within the width of the peak b_SL and b_SR
// Initialization
hist_max = -1
// Find leftmost bin with maximum value
for (b = 0; b < N_B; b + +) {
   if (hist(b) > hist_max) {
      b_ML = b
      hist_max = hist(b)
   }
}
// Find rightmost bin with maximum value of the same peak
b_MR = b_ML
for (b = b_ML + 1; b < N_B; b + +) {
   if (hist(b) == hist_max) {
      b_MR = b
   }
   else {
```

```
      break
   }
}
// Find leftmost bin within the width of the peak
b_SL = b_ML
for (b = b_ML − 1; b ≥ 0; b − −) {
   if (hist(b) ≥ r_peak × h_max) {
      b_SL = b
   }
   else {
      break
   }
}
// Find leftmost bin within the width of the peak
b_SR = b_MR
for (b = b_MR + 1; b < N_B; b + +) {
   if (hist(b) ≥ r_peak × h_max) {
      b_SL = b
   }
   else {
      break
   }
}
return b_ML, b_MR, b_SL, b_SR
```

A.2 Surround Area Classifier

In what follows, the term "classifier" refers to the module that takes the features of the histogram to predict a score indicating whether surround areas exist or not. A score bigger than zero means there are surround areas, and a score equal to or smaller than zero means there are no surround areas.

In view of the what has been described in the previous section, a potential peak in the histogram may have been found and the next step may be that of indicating if such peak is due to surround area. In order to perform such step, two classifiers according to the teachings of the present disclosure may be defined: 1) peak classifier 2) boundary classifier. As will be described later, the output results from such classifiers may be combined for an improved accuracy.

A.2.1 Peak Classifier

In an embodiment, the peak classifier predicts the surround area based on the width of the peak. Ideally, in the noise-free scenario, the width of the peak should be 0, i.e. $b_{SR}=b_{SL}$. However, in practical conditions, there might be compression artifact or other noise in the image. The noise may be considered to act, for example, like an additive white Gaussian noise with standard deviation $\sigma_{noise}$. In this case, if there is a surrounding area in the image, half of the width of peak should be close to $\sigma_{noise}$. As such, given the observed noise (half of the width of the peak) $\Delta b_{peak}=(b_{SR}-b_{SL})/2$, the detection score of peak property may be defined, for example, using piecewise linear function as shown in eq. 1 below. The larger the score $s_{peak}$, the more likely there is a surround area.

$$s_{peak} = \begin{cases} \frac{(\Delta b_{peak} - \theta_{peak})}{(\theta_{peak,pos} - \theta_{peak})} & \text{if } \Delta b_{peak} < \theta_{peak} \\ -\frac{(\Delta b_{peak} - \theta_{peak})}{(\theta_{peak,neg} - \theta_{peak})} & \text{if } \Delta b_{peak} \geq \theta_{peak} \end{cases} \quad (1)$$

With reference to eq. 1, $\theta_{peak}$ is the decision threshold for peak property. $\theta_{peak,pos}$ and $\theta_{peak,neg}$ are decision thresholds with additional margin on the positive and negative sides for peak property, respectively. Moreover, $\theta_{peak,pos} < \theta_{peak} < \theta_{peak,neg}$. From Equation 1 it can be noticed that when $\Delta b_{peak} < \theta_{peak}$, the score gradually increases and reaches 1 at $\Delta b_{peak} = \theta_{peak,pos}$. On the other hand, when $\Delta b_{peak} \geq \theta_{peak}$, the score gradually decreases and reaches −1 at $\Delta b_{peak} = \theta_{peak,neg}$. FIG. 5 shows an exemplary graph (500) illustrating $s_{peak}$ as a function of $\Delta b_{peak}$. It is noted that $-\infty < s_{peak} < \infty$, but may be clipped to [−1, 1] later in final total score. Default values of the decision thresholds may be defined as, for example, $\theta_{peak}=1.5\sigma_{noise}$, $\theta_{peak,pos}=\sigma_{noise}$, and $\theta_{peak,neg}=2\sigma_{noise}$. Additionally, default noise may be defined for example, as level $\theta_{noise}=2$ for 10-bit input images, but it may be adjusted by user if the expected noise is known. If the input image is known to be noise free, $\theta_{noise}$ may be set to a very small number close to 0.

A2.2. Boundary Classifier

The boundary classifier's function is to predict the surround area based on the boundary property. The more pixels on the image boundary belong to the peak, the more likely the peak is from a surround area. Therefore, with predefined minimum width and height of surround area $W_{L,min}$ and $H_{L,min}$, the ratio of the pixels that belong to the peak on the minimum possible surround areas at the four boundaries (top, bottom, left, and right) of the image can be found. In an embodiment, the maximum ratio from the four boundaries are taken into account as the surround area can be at either boundary. Empirically, the minimum width and height of surround area may be set as, for example, $W_{L,min}$=round (0.01×W) and $H_{L,min}$=round (0.01×H). The following table is an example of how the ratio of pixels $r_{boundary}$ that belong to the peak on the minimum possible surround area is calculated.

Calculate the ratio of pixels that belong to the peak on the minimum possible surround area Input: input image $S^Y$, rightmost bins within the width of the peak $b_{SL}$ and $b_{SR}$, starting pixel value in histogram $s_{start}$, minimum width and height of surround area $W_{L,min}$ -continued and $H_{L,min}$
Output: ratio of pixels that belong to the peak on the minimum possible surround area
$r_{boundary}$
// Top
$n_{valid,top} = 0$
for (i = 0; i < $H_{L,min}$; i ++) {
   for(j = 0; j < W; j ++) {
      b = $\lfloor (S^Y (i, j) - s_{start})/w_{bin} \rfloor$
      if (b ≥ $b_{SL}$ and b ≤ $b_{SR}$) {
         $n_{valid,top}$ ++
      }
   }
}
$r_{boundary,top} = n_{valid,top}/(H_{L,min} \times W)$
// Bottom
$n_{valid,bottom} = 0$
for (i = H − $H_{L,min}$; i < H; i ++) {
   for(j = 0; j < W; j ++) {
      b = $\lfloor (S^Y (i, j) - s_{start})/w_{bin} \rfloor$
      if (b ≥ $b_{SL}$ and b ≤ $b_{SR}$) {
         $n_{valid,bottom}$ ++
      }
   }
}
$r_{boundary,bottom} = n_{valid,bottom}/(H_{L,min} \times W)$
// Left
$n_{valid,left} = 0$
for (i = 0; i < H; i ++) {
   for (j = 0; j < $W_{L,min}$; j ++) {
      b = $\lfloor (S^Y (i, j) - s_{start})/w_{bin} \rfloor$
      if (b ≥ $b_{SL}$ and b ≤ $b_{SR}$) {
         $n_{valid,left}$ ++
      }
   }
}
$r_{boundary,left} = n_{valid,left}/(H \times W_{L,min})$
// Right
$n_{valid,right} = 0$
for (i = 0; i < H; i ++) {
   for (j = W − $W_{L,min}$; j < W; j ++) {
      b = $\lfloor (S^Y (i, j) - s_{start})/w_{bin} \rfloor$
      if (b ≥ $b_{SL}$ and b ≤ $b_{SR}$) {
         $n_{valid,right}$ ++
      }
   }
}
$r_{boundary,right} = n_{valid,right}/(H \times W_{L,min})$
$r_{boundary} = \max(r_{boundary,top}, r_{boundary,bottom}, r_{boundary,left}, r_{boundary,right})$
return $r_{boundary}$ With reference to the table above, the higher the ratio $r_{boundary}$, the more likely the peak is from a surround area. Therefore, the detection score of the boundary property may be defined, for example, using a piecewise linear function, shown in eq. 2 below. The larger the score, the more likely there is a surround area $$s_{boundary} = \begin{cases} \frac{(r_{boundary} - \theta_{boundary})}{(\theta_{boundary,pos} - \theta_{boundary})} & \text{if } r_{boundary} \geq \theta_{boundary} \\ -\frac{(r_{boundary} - \theta_{boundary})}{(\theta_{boundary,neg} - \theta_{boundary})} & \text{if } r_{boundary} < \theta_{boundary} \end{cases} \quad (2)$$

In eq. 2, $\theta_{boundary}$ is the decision threshold for boundary property. $\theta_{boundary,pos}$ and $\theta_{boundary,neg}$ are decision thresholds with additional margin on the positive and negative sides for boundary property, respectively. Moreover, $\theta_{boundary,pos} > \theta_{boundary} > \theta_{boundary,neg}$. From Equation (2) it can be noticed that when $r_{boundary} \geq \theta_{boundary}$, the score gradually increases and reaches 1 at $r_{boundary} = \theta_{boundary,pos}$. On the other hand, when $r_{boundary} < \theta_{boundary}$, the score gradually decreases and reaches −1 at $r_{boundary} = \theta_{boundary,neg}$. FIG. 6 shows graph (600) illustrating $s_{boundary}$ as a function of $r_{boundary}$. It is noted that $-\infty < s_{boundary} < \infty$, but $s_{boundary}$ may be clipped to [−1, 1] later in final total score. In an embodiment, default values of the decision thresholds may be set as, for example, $\theta_{boundary} = 0.5$, $\theta_{boundary,pos} = 0.75$, and $\theta_{boundary,neg} = 0.25$.

A2.3 Total Detection Score

In order to calculate the total detection score, the two weak classifiers in previous sections are combined to obtain a more accurate classifier with soft classification margin. The surround area may satisfy the criteria in both above-disclosed classifiers. In an embodiment, the minimum score as the total detection score is taken into account for total score calculation, as shown in eq. 3 below.

$$s_{total} = \text{clip3}(\min(s_{peak}, s_{boundary}), -1, 1) \quad (3)$$

This means that when both classifiers predict high scores, a surround area is declared to be present. The larger the score, the more likely there is a surround area, and vice versa. FIG. 7 shows the combined classifier and soft classification margin. As shown, regions (71, 72, 73, 74) correspond to regions where $S_{total} = 1$, $0 < S_{total} < 1$, $-1 < S_{total} < 0$, and $S_{total} = -1$, respectively.

A3. Surround Area Modeling

With reference to FIG. 7 and from the result of what was disclosed in the previous section, if the total detection score $s_{total} > 0$, it can be concluded that there exists a surround area with peak properties $b_{ML}$, $b_{MR}$, $b_{SL}$, $b_{SR}$. The peak may be modeled using, for example, Gaussian kernels, so that the surround area can be represented as a smooth surround area mask. In an embodiment, two Gaussian kernels are used for left and right sides of the peak. Moreover, as shown in eq. 4 below, the mean of such Gaussian kernels for both sides is defined as the center between the maximum of the peak.

$$\mu_b = \frac{b_{ML} + b_{MR}}{2} \quad (4)$$

The standard deviation for left and right sides, shown in eqs. 5a, 5b respectively, are defined as the center to the width of the peak. The minimum may be clipped to 0.5 for numerical stability $$\sigma_{bL} = \max(\mu_b - b_{SL}, 0.5) \quad (5a)$$

$$\sigma_{bR} = \max(b_{SR} - \mu_b, 0.5) \quad (5b)$$

As shown in eq. 6 below, the probability is modeled using the scaled piecewise Gaussian kernel:

$$p_L(b) = \begin{cases} s_{total} \times \exp\left(-\frac{(b-\mu_b)^2}{2\sigma_{bL}^2}\right) & \text{if } 0 \le b < \mu_b \\ s_{total} \times \exp\left(-\frac{(b-\mu_b)^2}{2\sigma_{bR}^2}\right) & \text{if } \mu_b \le b < N_B \end{cases} \quad (6)$$

The probability as calculated in eq. 6 above is back-projected to obtain surround area probability map. The following table shows an example of how the process of back-projection for surround area probability map is performed.

---

Back-projection for surround area probability map
Input: input image $\tilde{S}^Y$, surround area probability $p_L$
Output: surround area probability map $M_L$
// Back-projection
for (i = 0; i < H; i++) {
  for(j = 0; j < W; j++) {
    b = $S^Y$ (i, j) − $s_{start}$
    if (b ≥ 0 and b < $N_B$) {
      $M_L$(i, j) = $p_L$(b)
    }
    else {
      $M_L$(i, j) = 0
    }
  }
}
return $M_L$

---

In what follows some exemplary results showing the performance of the disclosed methods in the case of rectangular and oval shaped surround areas and also in the case of surround area including text are presented.

Figures 8A, 8B:
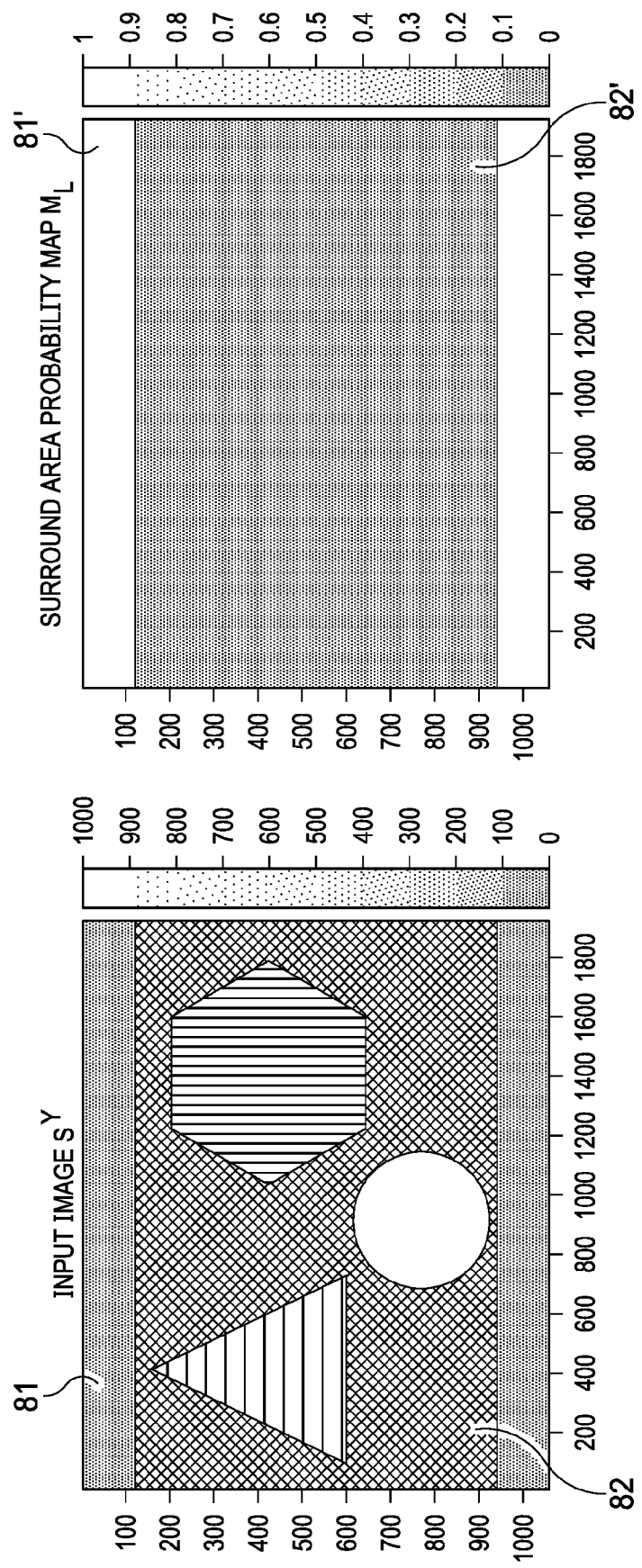
FIGS. 8A-8B, 9A-9B and 10A-10B show exemplary performances of the surround area detection process according to an embodiment of the present disclosure.

FIG. 8A shows an example image including surround area (81) and main area (82) which has a rectangular shape. FIG. 8B shows the result after applying the surround area detection process as disclosed above. The resulting detected surround area (81') and main area (82') can be noticed.

Figures 9A, 9B:
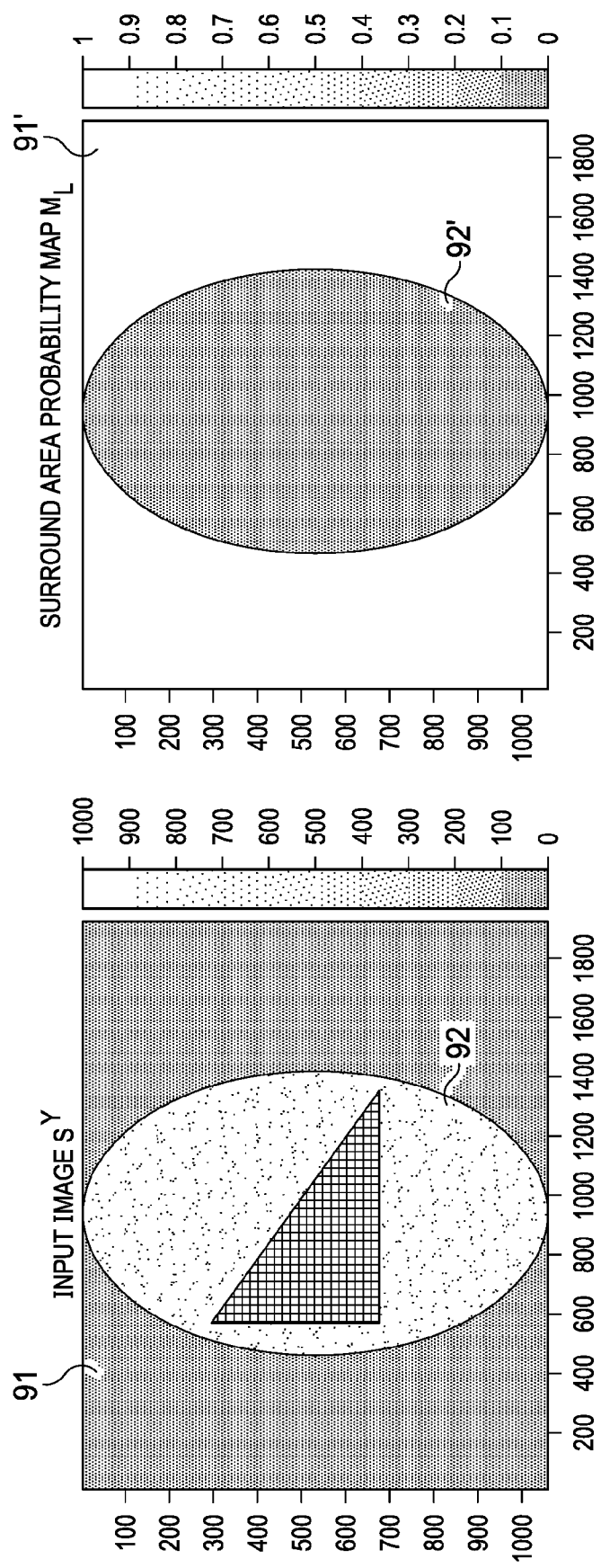

FIG. 9A shows an example image including surround area (91) and main area (92) which has an oval shape. FIG. 9B shows the result after applying the surround area detection process as disclosed above. The resulting detected surround area (91') and main area (92') are also shown.

Figures 10A, 10B:
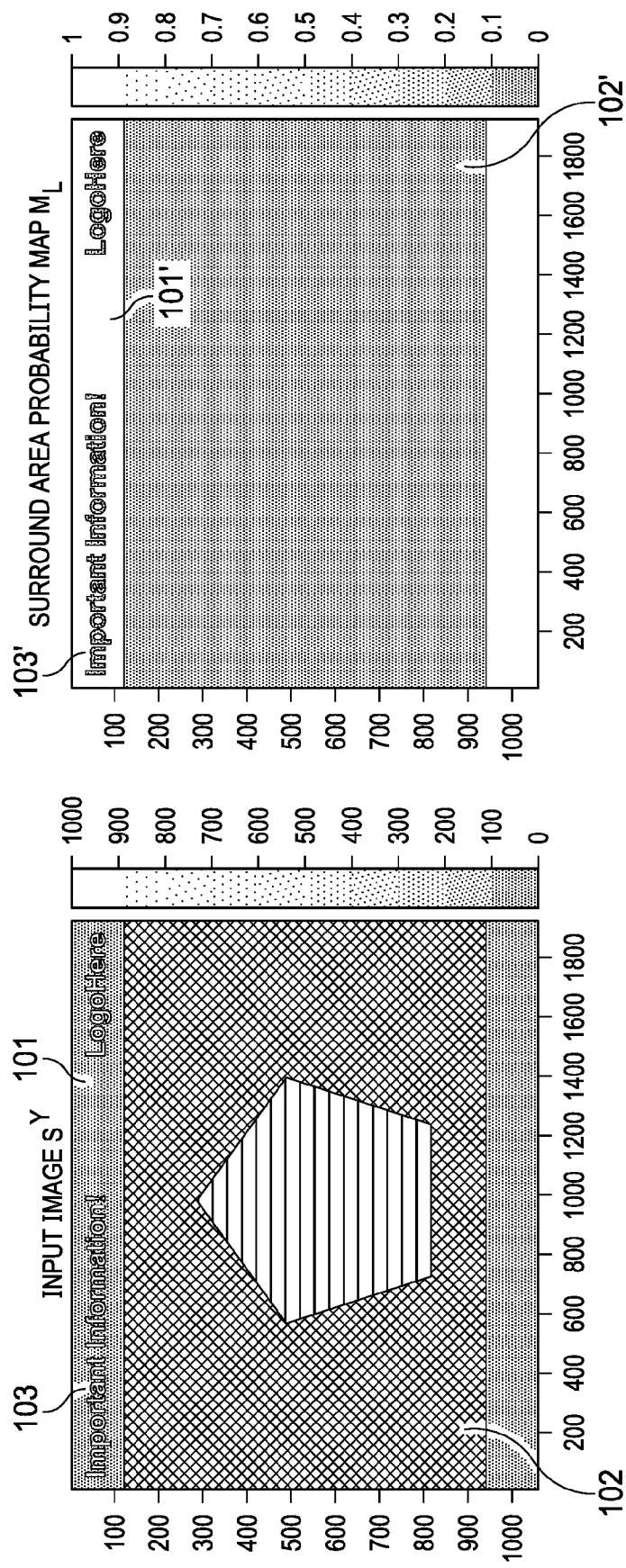

FIG. 10A shows an example image including surround area (101) and main area (102) which has a rectangular shape. Surround area (101) also include some text (103). The text can be, for example, close captioning, identifying information, or a logo. FIG. 10B shows the result after applying the surround area detection process as disclosed above. The resulting detected surround area (101'), main area (102'), and text (103') are also shown with the probability map identifying the regions of the surround area (101') not including the text/logos (103').

Figure 10C:
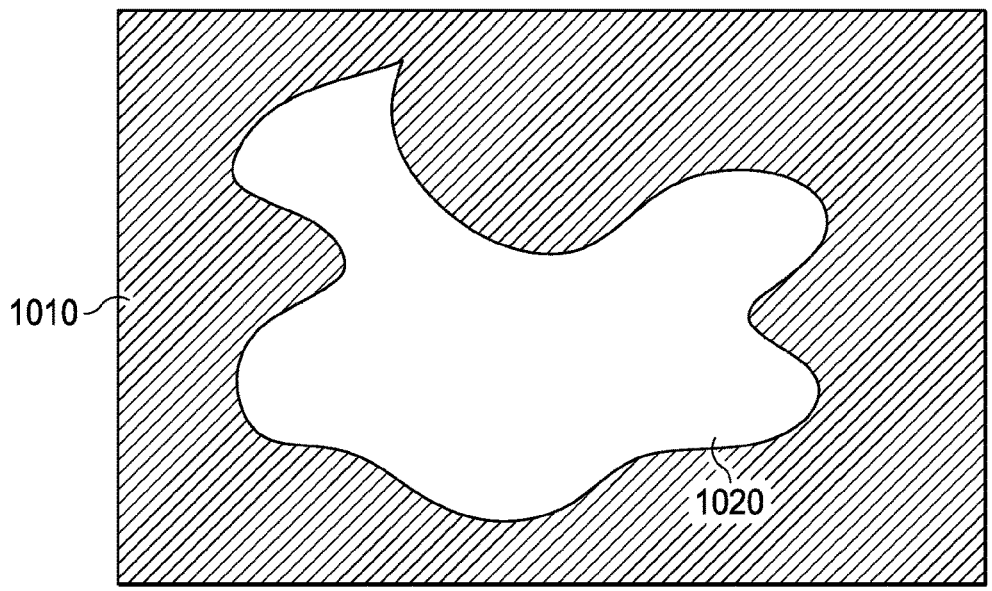
FIG. 10C shows an example image including a surround area with irregular shape.

FIG. 10C shows an example image including surround area (1010) and main area (1020). As can be noticed surround area (1010) has an arbitrary irregular shape. The above-disclosed methods are equally applicable to the example image of FIG. 10C.

According to embodiments of the present disclosure, if the total detection score $s_{total} \le 0$, it is concluded that there is no surround area and the surround area probability map $M_L$ may be filled with 0's.

B. Surround Area Blending

In view of the above-disclosed estimation of surround area probability map, the filtering artifact near surround can be reduced by avoiding the surround area in image filtering operations, such as the edge-preserving filter described in U.S. Prov. App. Ser. 63/086,699, incorporated herein by reference in its entirety. The filtering artifact is mainly due to the inconsistent trend in pixel values between the image content area and the surround area. An efficient way to reduce the filtering artifact in accordance with the teachings of the present disclosure is to blend the surround area with the nearby image content. In this case, there will be little inconsistency between the image content area and the surround area, and thus the filtering artifact is reduced. In another perspective, this approach is similar to inpainting the missing image content in the surround area. If the image filter can see the missing image content during filtering, the filtering artifact will be minimal. Although there exist some common methods to handle the filtering boundary, such as repeating boundary pixels, mirroring, or periodic padding, they are for rectangle image contents and cannot handle surround area boundaries with arbitrary shapes.

Figure 11:
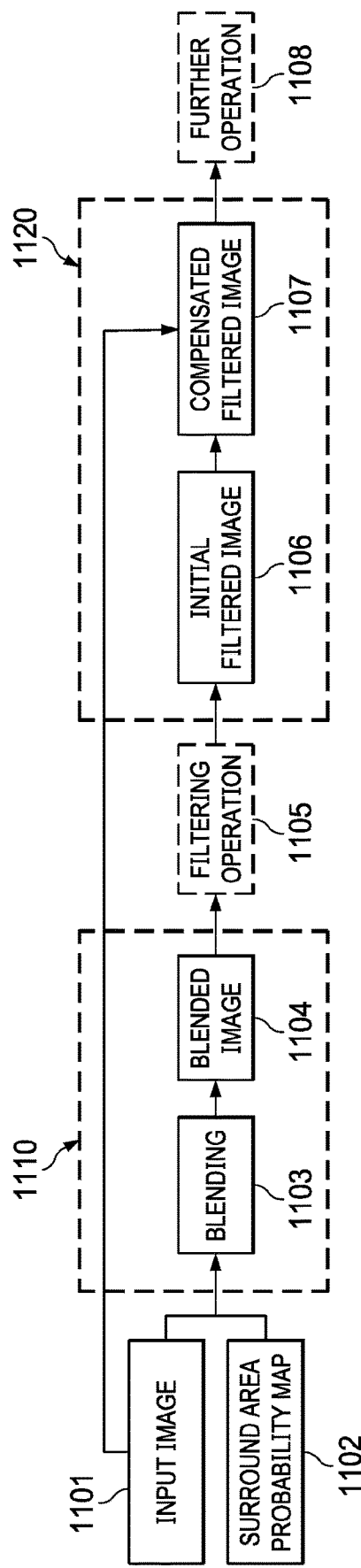
FIG. 11 shows an exemplary flowchart of the surround area blending process according to an embodiment of the present disclosure.

FIG. 11 shows an exemplary flowchart of the surround area blending process including pre-processing/blending step (1110) and post-processing/compensation step (1120), according to an embodiment of the present disclosure. Given an input image (1101) and detected surround area probability map (1102) as previously disclosed, the surround area is blended with the main area of the image in step (1103) to generate blended image (1104). Blending step (1103) may implement, for example, 1) weighted Gaussian filtering, or 2) mirroring with distance transform. The blended image (1104) is then sent to the filtering operation (1105) which is an optional step and may consist of any arbitrary filtering operation such as the edge-preserving filter in U.S. Prov. App. Ser. 63/086,699, incorporated herein by reference in its entirety. After filtering (1105), the original surround area needs to be recovered. Therefore, the initial filtered image (1106) is compensated so that the pixel values in the surround area are the same as the original input image (1101). As a result, a compensated image (1107) is generated which may then be optionally go through further operations (1108). An example of further operation (1108) is local reshaping as described, for example, in U.S. Prov. App. Ser.

63/086,699 mentioned above. In what follows various elements of blending process shown in FIG. 11 are described more in detail.

B1. Weighted Gaussian Filtering

Figure 12:
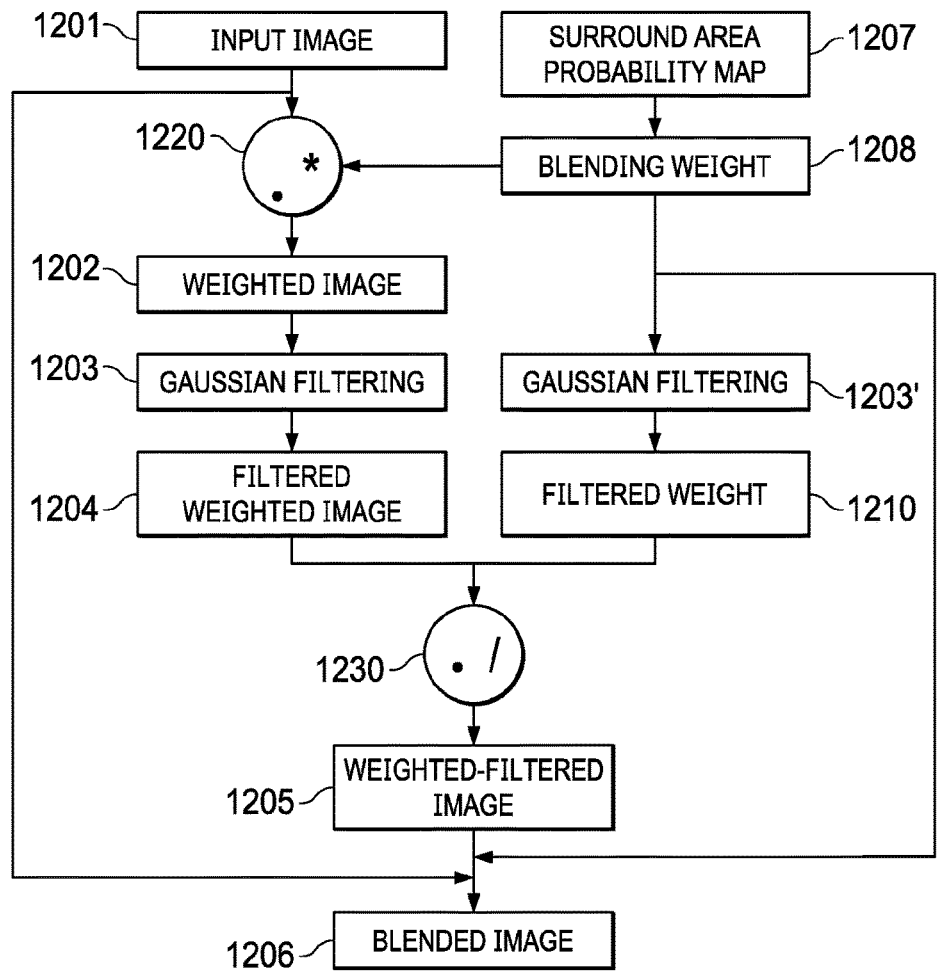
FIG. 12 shows an exemplary flowchart of the weighted Gaussian filtering process as applied according to an embodiment of the present disclosure.

As mentioned previously, an exemplary method of blending is to use weighted Gaussian filtering. FIG. 12 shows an exemplary flowchart of the weighted Gaussian filtering process. The goal here is to fill the surround area with nearby image content. Therefore, a blending weight (1208) Q is defined as show in eq. 7 below:

$$Q=1-M_L \qquad (7),$$

where $M_L$ represents surround area probability map (1207). The larger the probability of a pixel belonging to surround area, the smaller the weight and the contribution to the blending, and vice versa. Operators (1220, 1230), i.e. .* and ./, are elementwise multiplication and division, respectively. Given an input image (1201) and by applying blending weight (1208), weighted image (1202), i.e. $Q.*\tilde{S}^Y$, is obtained, where $\tilde{S}^Y$ represents normalized input image in [0, 1] scale ($\tilde{S}^Y = S^Y/2^{B^S}$) and $B^S$ is the bit depth of the input image. After applying Gaussian filtering (1203) to the weighted image (1202) a filtered weighted image, i.e. $\mathcal{G}_{\sigma_{blend}}(Q.*\tilde{S}^Y)$ is obtained as shown in step (1204), wherein $\mathcal{G}_{\sigma_{blend}}(\bullet)$ represents the Gaussian filtering with standard deviation $\sigma_{blend}$. Moreover, by also applying Gaussian filtering (1203') to the blending weight Q, a filtered weight (1210), $\mathcal{G}_{\sigma_{blend}}(Q)$, is also resulted in. After applying elementwise division operator (1230) to a combination of filtered weighted SDR (1204) and filtered weight (1210), a weighted-filtered image (1205), i.e. $\tilde{S}^{Y,(w)}$, is obtained. The above-described process can be summarized through the following mathematical expression shown as eq. 8:

$$\tilde{S}^{Y,(w)} = \mathcal{G}_{\sigma_{blend}}(Q.*\tilde{S}^Y)./\mathcal{G}_{\sigma_{blend}}(Q) \qquad (8)$$

Empirically, $\sigma_{blend}$ may be selected, for example, to be the maximum filtering kernel size that will be used in following filtering operation for local reshaping. In addition, to avoid division by 0, $\tilde{S}^{Y,(w)}$ may be set equal to $\tilde{S}^Y$ at the pixel locations where $\mathcal{G}(Q)$ is 0. Alternatively, the minimum value in Q may be clipped to a very small number (e.g. $10^{-6}$) so that $\mathcal{G}(Q)$ is always positive. The implementation detail of the approximated Gaussian filter can be found, for example, in the above-mentioned U.S. Prov. App. Ser. 63/086,699.

With further reference to FIG. 12, after the weighted Gaussian filtering, the surround area in $\tilde{S}^{Y,(w)}$ may be filled by the nearby image content. However, the image content area is also filtered, which may be undesired, because it is only desired to remove the discontinuity but not to change the image content. As such, a weighted summation may be implemented to obtain, based on the input image (1201), the blending weight (1208), and weighted-filtered image (1205), the final blended image (1206), as shown in eq. 9 below:

$$\tilde{S}^{Y,(b)} = \tilde{S}^Y.*Q + \tilde{S}^{Y,(w)}*(1-Q) \qquad (9)$$

As a result, the image content will be preserved in the blended image (1206).

B.2 Mirroring with Distance Transform

Figure 13:
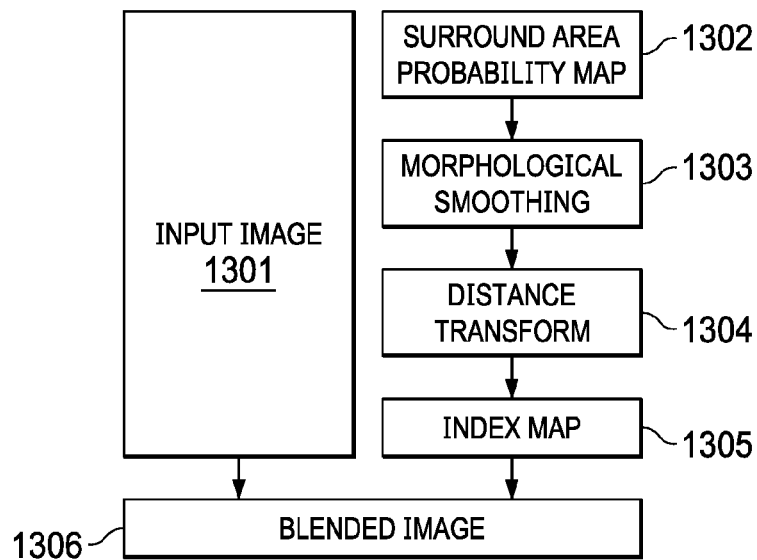
FIG. 13 shows an exemplary flowchart of the mirroring with distance transform process as applied according to an embodiment of the present disclosure.

As mentioned previously, another exemplary method of surround area blending is using mirroring with distance transform. The flow chart illustrating such method is shown in FIG. 13. According to the teachings of the present disclosure, the surround area can be filled by mirroring the nearby image content. Based on the surround area probability map (1302), thresholding on surround area mask is performed to obtain the binary image content mask. A morphological smoothing operation (1303) is then applied to remove small noise. This is shown in eq. 10 given below:

$$M_F = \mathcal{M}_{close,se}(\mathcal{M}_{open,se}(1(M_L < \theta_M))) \qquad (10)$$

The threshold $\theta_M$ may be set, for example, as $\theta_M = \exp(-0.5) \approx 0.6065$. The function $1(x)=1$ if condition x is true, and 0 if condition x is false. Operators $\mathcal{M}_{open,se}$ and $\mathcal{M}_{close,se}$ are morphological opening and closing, respectively, with structuring element se. We use rectangle structuring element of size, for example, 5×5 may be used for se. The distance transform (1304) of the binary image content mask $\tilde{M}_F$ may then be calculated. The distance transform (1304) finds the distance from each pixel to the nearest nonzero pixel in a binary image, see also reference [2], incorporated herein by reference in its entirety. The distance metric used may be, for example, the Li distance (also called city block distance or Manhattan distance).

Continuing with flowchart of FIG. 13, the nearest pixel in image content area to each pixel in the surround area is known, see also reference [2] mentioned above. The nearest pixel can then be used as origin to perform point reflection to blend the surround area pixel with image content. The nearest pixel's x- and y-index maps (1305) are denoted as $I_x$ and $I_y$, and the blended image (1306) is obtain as shown in eq. 11 below:

$$\tilde{S}^{Y,(b)}(i,j) = \tilde{S}^Y(2I_y(i,j)-i, 2I_x(i,j)-j) \qquad (11)$$

Moreover, if the pixel location after point reflection is out of image area, the nearest pixel on the image boundary is chosen instead. The table below is an example of how mirroring with distance transform is performed:

---

Mirroring with distance transform
Input: input image $\tilde{S}^Y$, index maps $I_x$ and $I_y$
Output: blended image $\tilde{S}^{Y,(b)}$
for (i = 0; i < H; i + +) {
  for (j = 0; j < W; j + +) {
    i' = min(max(2$I_y$(i, j) − i, 0), H − 1)
    j' = min(max(2$I_x$(i, j) − j, 0), W − 1)
    $\tilde{S}^{Y,(b)}$(i, j) = $\tilde{S}^Y$ (i', j') }
}
return $\tilde{S}^{Y,(b)}$

---

In the case where $\tilde{M}_L$ is all 0, the distance transform is not calculated and the blended image is simply is set as $\tilde{S}^{Y,(b)} = \tilde{S}^Y$.

Surround Area Compensation

With reference to eq. 11, in an embodiment, the blended image $\tilde{S}^{Y,(b)}$ may be sent to an image filtering operation to avoid the filtering artifact and get the initial filtered image. This is shown in eq. 12 shown below:

$$\tilde{S}^{Y,(i)} = IF(\tilde{S}^{Y,(b)}) \qquad (12)$$

Figure 14:
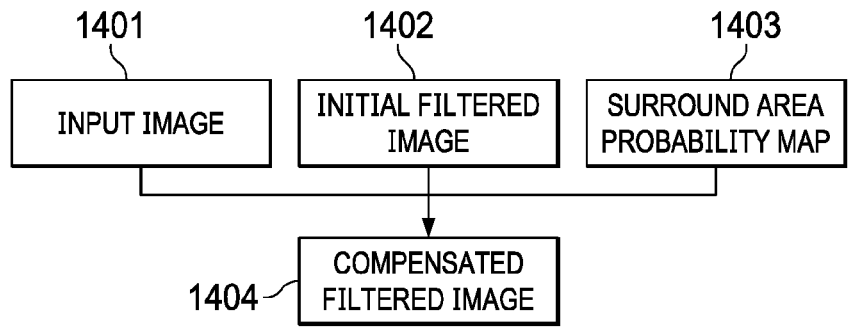
FIG. 14 shows an exemplary flowchart of the compensation/post-process procedure according to an embodiment of the present disclosure.

The operator IF(•) can be any image filtering operations, such as the edge-preserving filter in reference [1]. $\tilde{S}^{Y,(i)}$ represents the result after filtering operations which will be referred to in what follows as the initial filtered image. As the blended (pre-processed) image contains extra image content that does not exist in the original input image in the surround area and so does the initial filtered image, we need to compensate (post-process) it before we send it to further operation, such as local reshaping [1]. FIG. 14 shows the flowchart of an example of such compensation/post-processing procedure. Based on the initial filtered image (1402) $\tilde{S}^{Y,(i)}$, the initial input image (1401), $\tilde{S}^Y$, and surround area probability map (1403), $M_L$, the compensated filtered image (1404), $\tilde{S}^{Y,(cl)}$, is calculated as shown in eq. 13 below:

$$\tilde{S}^{Y,(cl)} = \tilde{S}^{Y,(l)} * (1-M_L) + \tilde{S}^{Y} * M_L \quad (13)$$

For the pixels in surround area, $M_L$ is close to 1, and $\tilde{S}^{Y,(cl)}$ will be close to $\tilde{S}^Y$. In other words, the previously blended surround area will be compensated and become the same as the original input image and is ready for further operation, such as local reshaping.

In the above-disclosed embodiments, the histogram of the Y channel is used for description purpose, and for surround areas that could be distinguished by luma. In some embodiments (e.g. the cases where luma is not enough), histograms of U and V channels may be further used for classification, in the same way as what was disclosed based on the histogram of the Y channel. In addition, the classification results from Y, U and V channels may be combined to obtain an improved result. As an example, the union of the surround areas detected by Y, U and V may be considered as the overall detected surround area.

A number of embodiments of the disclosure have been described. Nevertheless, it will be understood that various modifications may be made without departing from the spirit and scope of the present disclosure. Accordingly, other embodiments are within the scope of the following claims.

The present disclosure is directed to certain implementations for the purposes of describing some innovative aspects described herein, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module", a "device", an "apparatus" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

REFERENCES

[1] William M. Wells, "Efficient Synthesis of Gaussian Filters by Cascaded Uniform Filters," IEEE Transactions on Pattern Analysis and Machine Intelligence, vol. 8, no. 2, pp. 234-239, 1986.

[2] Maurer, Calvin, Rensheng Qi, and Vijay Raghavan, "A Linear Time Algorithm for Computing Exact Euclidean Distance Transforms of Binary Images in Arbitrary Dimensions," IEEE Transactions on Pattern Analysis and Machine Intelligence, vol. 25, no. 2, pp. 265-270, 2003.

The invention claimed is:

1. A method for detecting a non-active area in an image, the method comprising:
    calculating a histogram of a predefined area located at a boundary of the image;
    finding a peak and a width of the peak of the histogram;
    based on the peak and the width of the peak of the histogram, classifying a presence of the non-active area in the image, thereby generating a peak detection score;
    based on a ratio of the pixels that belong to the peak on a predefined minimum possible non-active areas at the predefined area located at the boundary of the image, classifying the presence of the non-active area in the image, thereby generating a boundary detection score;
    generating a total score based on a combination of the peak and the boundary detection scores, and
    detecting the presence of the non-active area based on the total score.

2. The method of claim 1, further comprising modeling the peak of the histogram using a smoothing filter to represent the non-active area as a non-active area mask.

3. The method of claim 2, wherein the smoothing filter comprises Gaussian kernels.

4. The method of claim 2, further comprising generating a non-active area probability map based on the non-active area mask, wherein the non-active area probability map provides, for all pixels in the image, a probability that a pixel of the image belongs to the non-active area.

5. The method of claim 4, wherein the generating the non-active area probability map includes:
    calculating a probability using a scaled piecewise Gaussian kernel, and
    back-projecting the probability to generate the non-active area probability map.

6. The method of claim 4 further comprising blending the non-active area and a main subject of the image based on the non-active area probability map.

7. The method of claim 6, wherein the blending is performed using a weighted gaussian filtering.

8. The method of claim 7, further comprising:
calculating a blending weight based on the non-active area probability map, and
generating a weighted image based on the image and the blending weight.

9. The method of claim 8, further comprising:
gaussian filtering the blending weight to generate a filtered weight;
gaussian filtering the weighted image to generate a filtered weighted image, and
generating a weighted-filtered image based on the filtered weighted image and the filtered weight.

10. The method of claim 9, further comprising generating a blended image using a weighted summation of the image and the weighted-filtered image.

11. The method of claim 6, wherein the blending is performed using a mirroring with distance transform.

12. The method of claim 11 wherein the mirroring comprises:
performing thresholding on the non-active area mask to generate a binary image content mask;
applying morphological smoothing to the binary image content mask;
calculating a distance transform of the binary image content mask;
using the distance transform, for each pixel in the non-active area, identifying a nearest pixel in an image content area to the each pixel;
generating an index map of nearest pixels, and
generating a blended image using the image and the index map of the nearest pixels.

13. The method of claim 12, further comprising:
filtering the blended image to generate a filtered blended image.

14. The method of claim 13, wherein the filtering comprises edge-preserving filtering.

15. The method of claim 13, further comprising performing a weighted addition of the image and the filtered blended image.

16. The method of claim 15, wherein the weighted addition is performed based on the non-active area probability map.

17. The method of claim 1, wherein the image comprises an active area and the non-active area, wherein the detected non-active area is an area having a constant pixel value with some noise and it is located at the boundary of the image, and the non-active area is a static area of the image.

18. The method of claim 1, wherein the predefined area is located between the topmost (HL) rows and bottommost (HL) rows of the image, and/or between the leftmost (WL) columns and the rightmost (WL) columns of the image.

19. The method of claim 1, wherein classifying the presence of the non-active area in the image, thereby generating the boundary detection score, is based on a maximum ratio of the pixels that belong to the peak on a minimum possible non-active areas at the predefined area.

20. The method of claim 1, wherein the peak detection score and the boundary detection score are larger when there is more likelihood of the presence of the non-active area.

21. The method of claim 1, wherein the total score is based on a minimum between the peak detection score and the boundary detection score.

22. The method of claim 1, wherein the width of the peak is defined by bins on the two opposite sides of the peak where a value of the histogram drops to a ratio of a maximum value of the histogram.

23. A non-transitory computer program product comprising instructions which, when the program is executed by a computer, cause the computer to carry out the method of claim 1.

* * * * *